(12) United States Patent
Dietmeier

(10) Patent No.: US 8,279,130 B2
(45) Date of Patent: Oct. 2, 2012

(54) MICROWAVE ANTENNA FOR A LEVEL INDICATOR

(75) Inventor: Juergen Dietmeier, Hausach (DE)

(73) Assignee: Vega Grieshaber KG, Wolfach (DE)

( * ) Notice: Subject to any disclaimer, the term of this patent is extended or adjusted under 35 U.S.C. 154(b) by 470 days.

(21) Appl. No.: 12/585,026

(22) Filed: Sep. 1, 2009

(65) Prior Publication Data

US 2010/0079348 A1    Apr. 1, 2010

Related U.S. Application Data

(60) Provisional application No. 61/136,777, filed on Oct. 2, 2008.

(30) Foreign Application Priority Data

Oct. 1, 2008  (EP) .................................... 08017287

(51) Int. Cl.
*H01Q 13/00* (2006.01)

(52) U.S. Cl. ......... 343/786; 343/784; 342/124; 342/118

(58) Field of Classification Search .................. 343/772, 343/784, 786; 342/124, 118, 175, 198; 73/290 R, 73/290 V; 324/629, 637, 642, 644

See application file for complete search history.

(56) References Cited

U.S. PATENT DOCUMENTS

| | | | |
|---|---|---|---|
| 6,820,510 B2 * | 11/2004 | Schroth et al. | 73/866.5 |
| 6,891,513 B2 * | 5/2005 | Kienzle et al. | 343/786 |
| 7,515,095 B2 * | 4/2009 | Wilkie et al. | 342/124 |
| 7,864,104 B2 * | 1/2011 | Chen et al. | 342/124 |

FOREIGN PATENT DOCUMENTS

| | | |
|---|---|---|
| DE | 297 09 926 U1 | 10/1997 |
| DE | 100 57 441 A1 | 5/2002 |
| DE | 10 2005 022 493 A1 | 11/2006 |
| DE | 10 2005 056 042 A1 | 5/2007 |
| EP | 0 616 385 A1 | 9/1994 |
| EP | 1 448 959 A1 | 8/2004 |
| JP | 2002-9542 A | 1/2002 |
| WO | WO 02/41446 A1 | 5/2002 |
| WO | WO 03/046491 A1 | 6/2003 |
| WO | WO 03/078936 A1 | 9/2003 |

OTHER PUBLICATIONS

Habenauer Bodenstein, "Maschinenelemente". (With Statement of Relevance attached).

* cited by examiner

*Primary Examiner* — Hoang V Nguyen
(74) *Attorney, Agent, or Firm* — Nath, Goldberg & Meyer; Jerald L. Meyer; Robert T. Burns

(57) ABSTRACT

Microwave antenna for a level indicator, with an antenna cavity having a radiating aperture which can be closed with an HF-permeable disk that is fixed in position within the antenna cavity by means of a snap ring, and at least one sealing component is provided to seal the transitional area between the disk and the microwave antenna.

14 Claims, 1 Drawing Sheet

MICROWAVE ANTENNA FOR A LEVEL INDICATOR

Figure 1:
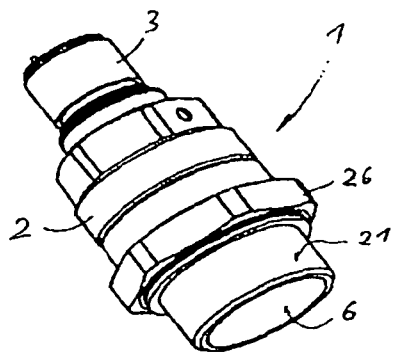

This is an application claiming the benefit under 35 U.S.C. 119(e) of U.S. Provisional Application No. 61/136,777, filed on Oct. 2, 2008, and claiming foreign priority benefits under 35 U.S.C. 119 of European Patent Application No. 08 017287.7, filed on Oct. 1, 2008, the entire content of each of which is hereby incorporated by reference in its entirety.

The claimed subject matter relates to a microwave antenna for a level indicator, in accordance with the exemplary embodiments disclosed herein.

Level indicators are used to measure the fill level of liquids and bulk materials in a container. Here a distinction is made between continuous measurement performed by level sensors as opposed to limit-state sensors. The selection of a suitable method of measurement depends on whether gases, liquids, or bulk materials are involved, as well as on such general factors as the pressure and temperature within the containers.

Among other technologies employed in level measurement is radar, whose microwaves are generated in a high-frequency module and are fed, e.g., via an exciter pin, into a waveguide, which is coupled to a microwave antenna, particularly a horn antenna. Electromagnetic energy in the form of microwaves is radiated through the radiating hole or aperture of this microwave antenna and may then be received back again, in order to determine the transit time of a radar impulse transmitted to, and reflected by, the bulk material. This makes it possible to measure the fill level.

These microwave antennas are manufactured from different materials, depending on the purpose of the application, and must allow for use in surroundings that are chemically aggressive. At the same time, the penetration of condensate or other impurities into the antenna cavity must be prevented.

DE 100 57 441 A1 proposes a horn antenna for a radar-based level indicator, where the antenna cavity is filled with a dielectrical material, so that the radiating aperture of the horn antenna is sealed. The process of pouring the dielectrical material and allowing it to harden is expensive and results in long manufacturing times.

Known from EP 1 448 959 B1, furthermore, is an antenna system with a horn antenna, whose radiating aperture is sealing by a disk of dielectrical material, though the sealing mechanism employed is not described.

The goal of the invention is to specify a microwave antenna for a level indicator, with an antenna cavity whose radiating aperture can be sealed against the given medium in a simple and cost-effective manner.

The goal is achieved with a microwave antenna for a level indicator in accordance with the exemplary embodiments disclosed herein.

For this microwave antenna, intended as it is for a level indicator with an antenna cavity, the disk which seals the radiating aperture is permeable to HF radiation and is fixed into position within the antenna cavity by means of a snap ring, while the transitional area between the disk and the microwave antenna is sealed with at least one sealing component.

The solution according to the invention provides a simple and cost-effective mounting of the disk in the antenna cavity and simultaneously guarantees a secure seal against the environment, while the sealing component is positioned either on the side of the snap ring facing the antenna cavity or on the opposite side. The efficacy of the seal can be enhanced if a sealing component is positioned on both sides of the snap ring.

Ideally the disk will be designed so that its cylindrical circumferential surface tapers conically in the direction of the antenna cavity and a contact area on one of the surfaces of the antenna cavity surrounds the disk in a basically form-fitting manner. With this conical design of the disk, which permits its advantageous adaption to the conical curve of the horn antenna, it is considerably simpler to mount the disk within the antenna cavity. In particular, preliminary centering of the disk inside the antenna cavity is possible during mounting.

In an elaboration of the invention a circular groove is provided on the circumference of the disk, and the snap ring is partially embedded in this groove in order to fix the disk in axial position. Here the part of the snap ring projecting from the circumferential surface fits into a groove in the contact surface, and this circular groove in the contact surface has a radial depth such that the snap ring can spread out or expand more or less completely inside the groove, upon insertion of the disk. In conjunction with the conically shaped disk, the mounting of the snap ring is considerably simplified in that the snap ring is first placed in the circular groove on the contact surface and then, upon insertion of the disk, is spread out in the groove on the contact surface due to the conical curve of the circumferential surface, before engaging with the groove on the circumferential surface.

It is particularly advantageous here if the circumferential surface of the disk tapers in step-like fashion and if the snap ring is positioned on one step of this tapered area. This permits a simplification in the manufacture of the grooves provided for the snap ring, both the groove on circumferential surface of the disk and the groove on the contact surface, which also tapers in stepped fashion to correspond with the stepped circumferential surface of the disk. The sealing components can also be advantageously positioned in corresponding grooves on other such steps, as this simplifies their actual realization.

In an elaboration of the invention, the transitional zone on the circumferential surface of the disk, between the step which receives the snap ring and the adjoining step which lies in the tapering direction of the circumferential surface, is conically tapered in order to widen the snap ring into the circular groove formed on the contact surface upon introduction of the disk into the antenna cavity. This design results in a cylindrical shoulder which the conical transition adjoins, and this advantageously serves the preliminary centering of the configuration during assembly.

As indicated above, the sealing components may be positioned on the steps that form the tapered area of the circumferential surface of the disk. Here a sealing component can be advantageously positioned on a step adjacent to the snap ring, and it is highly advantageous if a sealing component is positioned on each of two steps adjacent to the snap ring.

In an elaboration of the invention the sealing component positioned in the tapering direction can be received by a groove provided in the contact area, while a radial notch of slight depth is provided on the corresponding step of the circumferential area. The result is that in mounting the disk in the aperture of the microwave antenna this sealing component is first inserted into the groove of the contact area and the disk is then introduced. The small notch in the circumferential surface means that damage to the sealing area is avoided.

A further simplification of the mounting process involves the sealing component that is placed in the direction opposite to the tapering direction and represents an elaboration of the invention in which circular arresting surfaces are provided to receive the sealing component. These arresting surfaces are positioned at a right angle to the axial direction, on both the circumferential surface of the disk and on the contact surface, and are axially spaced relative to each other.

To insure the secure mounting of the disk in the antenna cavity, a circumferential arresting surface is provided that runs perpendicular to the axial direction, at the end of the contact surface that extends in the tapering direction. The disk strikes this arresting surface when the radiating aperture is sealed by insertion of said disk. An appropriate amount of pressure on the disk after mounting will make certain that the disk rests securely against the arresting surface. The successful and complete assembly is thereby insured.

The HF-permeable disk is advantageously made from a dielectrical material, ideally PTFE (Teflon). For the snap ring a metallic round wire is employed, which is available as a standard and cost-effective material. The preferred sealing component is an O-ring, which is also available as a standard, cost-effective component.

Figure 3:
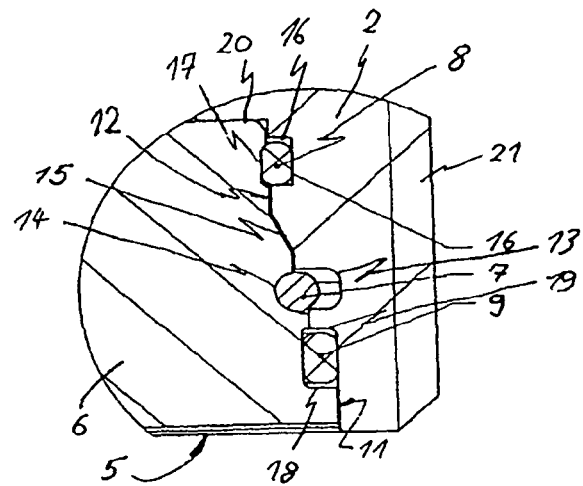
Figure 2:
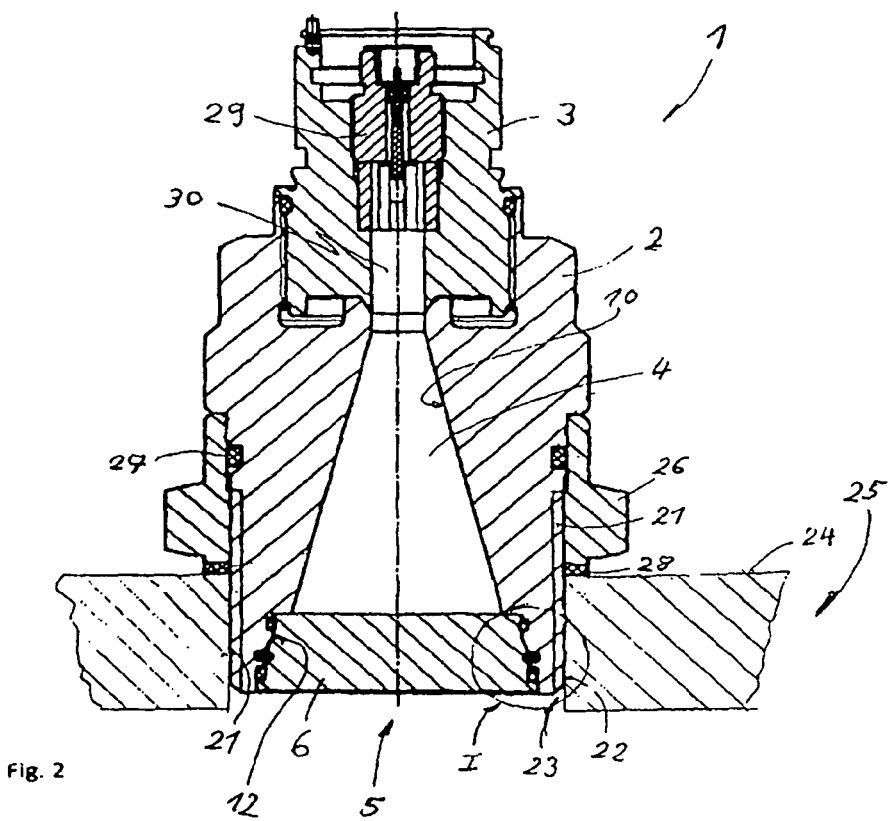

The invention is next described in detail on the basis of an exemplary embodiment, with reference to the attached figures. Shown are:

FIG. 1 a perspective view of a level indicator with a microwave antenna in accordance with the invention FIG. 2 a sectional view along the longitudinal axis of the level indicator of FIG. 1, shown after mounting on the fitting of a container FIG. 3 an enlarged view of the circled area I in FIG. 2.

The level indicator 1 with the microwave antenna according to the invention 2, as shown in FIGS. 1 and 2, is a limit-state sensor constructed as a microwave barrier, which operates as a radar sensor in that short microwave impulses are radiated into a container holding bulk material and the impulses reflected back by the bulk material are registered in order to determine, on the basis of the transit period, whether the limit state has been reached.

The radar impulses are produced by an electronics unit 29 contained in the housing 3 for the level indicator 1, and these radar impulses are coupled in a waveguide 30, which opens into the antenna cavity 4 of the microwave antenna and which is designed as a horn antenna. It is sealed against media by an HF-permeable disk 6 using a snap ring 7 and seals 8 and 9, as explained in greater detail below on the basis of FIG. 3. The cylindrical housing 3 is screwed into a blind hole on the front of the microwave antenna 2. The blind hole has an inner thread, and an O-ring ensures the necessary seal against the environment.

In order to execute its function as a level indicator, the microwave antenna 2 shown in FIG. 2 is designed as a screw-in fitting, with an outer thread 21. The level indicator 1 is screwed into a hole 23, which has an inner thread 22 and is located in the housing wall 24 of a container 25 that is only suggested in FIG. 2. The level indicator 1 is additionally tightened against the container wall 24 by means of a counter-nut. The area around the hole 23 of the container 25 may take the form of a tubular fitting with a mounting flange.

The level indicator 1 is sealed against the environment by two seals 27 and 28. The seal 27, which takes of the form of an O-ring, is covered, even when set, by the counter-nut 26 and seals the transition between the microwave antenna 2 and the counter-nut 26. The other seal is a gasket 28, which rests against a level face of the counter-nut lying adjacent to the container wall 24 and serves to seal the transition to the container wall 24.

The secure seal of the transition to the container wall 24, or a comparable tubular fitting, is realized by screwing the level indicator 1 with the microwave antenna 2 into the hole 23 in the container wall 24 by means of a counter-nut 26, which is screwed-in up to a stop, and the thread 21. The configuration is not screwed tight, however, and in this condition, rotating the level indicator 1 will bring it into the correctly installed position. The level indictor 1 can then be tightened against the container wall 24 using the counter-nut 26. In the process, the gasket 28 is squeezed between the face of the counter-nut 26 and the container wall 24, and thus provides a secure seal for this transition.

FIG. 3 shows an enlargement of the circled part I in FIG. 1 and depicts the transition between the disk 6, which seals the hole 5 in the antenna cavity 4, and the surface 10 of the antenna cavity 4. This surface 10 corresponds to the inner surface of the microwave antenna 2.

The HF-permeable disk 6, which as a rule consists of PTFE, is conically designed to have a circumferential surface 11 that tapers in steps toward the antenna cavity 4. This circumferential area 11 is more or less completely enclosed in form-fitting manner by a contact surface 12 that is furnished by the surface 10 of the antenna cavity 4.

On the outside, the disk 6 has its greatest diameter, which corresponds to the inner diameter at the rim of the hole 5 of the antenna cavity 4. The first step on the circumferential surface 11 of the disk 6 is formed by a circumferential arresting surface 18, which runs at a right angle to the longitudinal axis of the level indicator 1. Lying against this arresting surface 18 is the first seal 9, which takes the form of an O-ring, while a second arresting surface 19, which lies on the opposite side of the O-ring 9 and also runs perpendicular to the longitudinal axis, is formed by the contact surface 12. A notch is provided in the first step of the circumferential area 11 of the disk 6 (i.e., in the step that receives the O-ring 9), and the O-ring 9 embeds itself slightly in this notch.

The circumferential surface forming the transition to the next step is slightly inclined in the tapering direction relative to the plane perpendicular to the longitudinal axis of the level indicator 1, and passes into a groove 14 with a semicircular cross-section which serves to partially embed the snap spring 7. On the contact surface 12, the protruding part of the snap spring 7 projects into a groove 13 of rectangular cross-section, and the depth of this groove is such that the snap spring can completely spread open within this groove 13 when the disk 13 is mounted.

The transition to the last step on the circumferential surface 11 of the disk 6 is formed by a conically tapering section 15, which, through use of the truncated surface of this cone, serves, upon insertion of the disk 6 into the antenna cavity 4, to spread open the snap ring 7 lying in the groove 13, before it engages in the semicircular groove 14 on the circumferential surface 11, to thereby fix the disk 6 in place within the antenna cavity 4 and hold it there.

The section of the disk 6 with the final step for receiving and fixing in place the second seal 8, which is also an O-ring, represents a basically cylindrical shoulder, since this step has merely a circumferential notch 17 of slight depth, whose purpose is to hold the seal 8 in position. Thus this cylindrical shoulder serves the purpose of preliminary centering when the disk 6 is mounted inside the antenna cavity 4. In addition, the shallow notch 17 protects the area of the O-ring from damage to the sealing area when the disk 6 is mounted.

Before the disk 6 is installed there is a preassembly of the snap ring 7 in the groove 13, the second seal 8 in the groove 16 on the contact surface 12, and the first seal 9 onto the disk 6. By means of the forward cylindrical shoulder of the tapering front end of the disk 6 a preliminary centering occurs when the disk 6 is inserted into the hole 5 of the antenna cavity 4, whereupon the snap ring 7 spreads out due to the action of the conical section 15 and—upon further insertion of the disk 6—the engagement of the snap ring 7 in the groove 14 positioned on the circumferential surface 11 of the disk 6. It is not possible to press the disk 6 in further, since the front area of the disk 6 comes to rest against the arresting surface 20 formed on contact area 12 at the end of the tapering cone.

As already stated, the disk 6 is made of dielectrical material, ideally PTFE (Teflon). PP or PVDF may also be used.

The microwave antenna consists of metal or metalized plastic, e.g., polybutylene terephthalate (PBT) with a vacuum-coating of copper or a precious metal.

The housing that receives the electronics unit may be produced from plastic, metal (preferably high-grade steel), or a powder-coated aluminum die-casting.

The microwave antenna according to the invention may be used not only for limit-state sensors based on radar, but for all types of level indicators which operate on the basis of radar.

REFERENCE NUMERALS 1 level indicator
2 microwave antenna
3 housing
4 antenna cavity
5 hole of antenna cavity 4
6 disk
7 snap ring
8 O-ring
9 O-ring
10 surface of antenna cavity 4
11 circumferential surface of disk 6
12 contact surface
13 groove in contact surface 12
14 groove in circumferential surface 11
15 tapering on circumferential surface 11
16 groove in contact surface 12
17 notch in circumferential surface 11
18 arresting surface on circumferential surface 11
19 arresting surface on contact surface 12
20 arresting surface of arresting surface 12
21 outer thread on microwave antenna 2
22 inner thread of mounting hole of a container
23 container hole
24 container wall
25 container
26 counter-nut
27 O-ring
28 gasket
29 electronics unit
30 waveguide

The invention claimed is:

1. Microwave antenna for a level indicator, with an antenna cavity having a radiating aperture, such that the radiating aperture can be sealed with an HF-permeable disk, wherein
the disk is fixed in position inside the antenna cavity by means of a snap ring, and
at least one sealing component is provided to seal the transitional area between the disk and the microwave antenna,
wherein the at least one sealing component is on both sides of the snap ring.

2. The microwave antenna according to claim 1, wherein the at least one sealing component is on a side of the snap ring that is adjacent to the antenna cavity or that faces away from the antenna cavity.

3. The microwave antenna according to claim 1, further comprising:
a cylindrical circumferential surface of the disk tapering conically in a direction of the antenna cavity, and
a contact area on a surface at forms the antenna cavity and encloses in a form-fitting manner the cylindrical circumferential surface of the disk.

4. The microwave antenna according to claim 1, wherein
a partially embedding, circular groove provided in a circumferential surface of the disk fixes said disk in an axial position, and
a portion of the snap ring protruding from the circumferential surface of the disk extends into a circular groove in a contact area, and
the circular groove in the contact area has a depth extending in a radial direction such that the snap ring spreads out when the disk is inserted into the radiating aperture.

5. The microwave antenna according to claim 1, wherein
a circumferential arresting surface lies perpendicular to the axial direction at the end of the contact surface that runs toward the antenna cavity, and
the disk rests against this arresting surface and seals the radiating aperture upon insertion of said disk.

6. The microwave antenna according to claim 1, wherein the HF-permeable disk is a dielectrical material.

7. The microwave antenna according to claim 1, wherein the snap-ring is a metallic round-wire.

8. The microwave antenna according to claim 1, wherein the at least one sealing component is an O-ring.

9. A microwave antenna comprising:
an antenna cavity having a radiating aperture sealable with an HF-permeable disk;
a snap ring fixing an HF-permeable disk in position inside the antenna cavity;
at least one sealing component sealing a transitional area between the HF-permeable disk and the microwave antenna;
a cylindrical circumferential surface of the disk tapering conically in a direction of the antenna cavity; and
a contact surface that forms the antenna cavity and encloses in a form-fitting manner the cylindrical circumferential surface of the disk, wherein
the cylindrical circumferential surface of the disk tapers in stepped fashion, and
the snap ring is on one step of a stepped tapering portion of the circumferential surface of the disk.

10. The microwave antenna according to claim 9, wherein
to allow the snap ring to widen or spread out inside the circular groove in the contact surface when the disk is inserted into the antenna cavity,
a conically tapering transitional area is on the cylindrical circumferential surface between the step that receives the snap ring and the step adjacent to it in the tapering direction of the circumferential surface.

11. The microwave antenna according to claim 9, wherein the at least one sealing component is on a step lying adjacent to the snap ring and forming the conically tapering area.

12. The microwave antenna according to claim 11, wherein
the at least one sealing component lies in a tapering direction and is received by a groove in the contact surface, and
a radial notch is furnished in the corresponding step on the circumferential surface of the disk.

13. The microwave antenna according to claim 11, wherein
to receive the sealing component that is positioned opposite the tapering direction on both the circumferential surface of the disk and the contact surface,
circumferential arresting surfaces for the sealing component are positioned perpendicular to the axial direction and are spaced at a distance one each other in the axial direction.

14. The microwave antenna according to claim 9, wherein at least one additional sealing component is positioned on each of the steps lying adjacent to the snap ring and forming the conically tapering area.

* * * * *